May 12, 1959

R. B. BEARD 2,886,478

METHOD AND CONTROL APPARATUS FOR
CARBURIZING FERROUS OBJECTS

Filed June 29, 1953

INVENTOR.
RICHARD B. BEARD

BY

ATTORNEY.

May 12, 1959
R. B. BEARD
2,886,478
METHOD AND CONTROL APPARATUS FOR
CARBURIZING FERROUS OBJECTS
Filed June 29, 1953
2 Sheets-Sheet 2
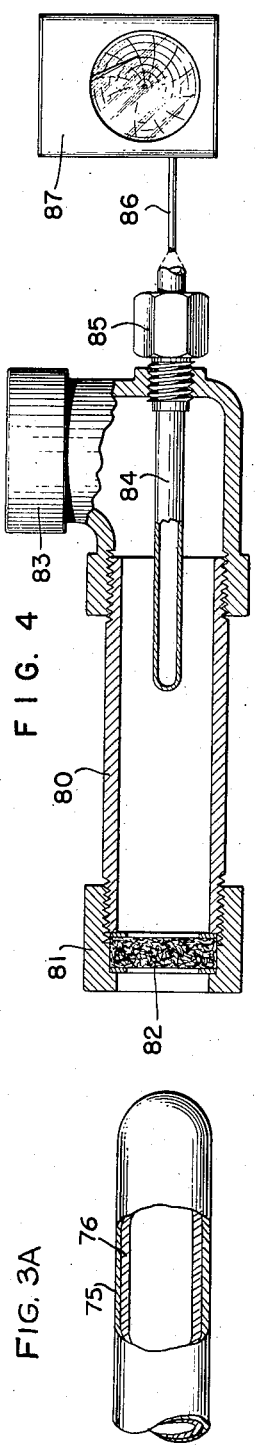
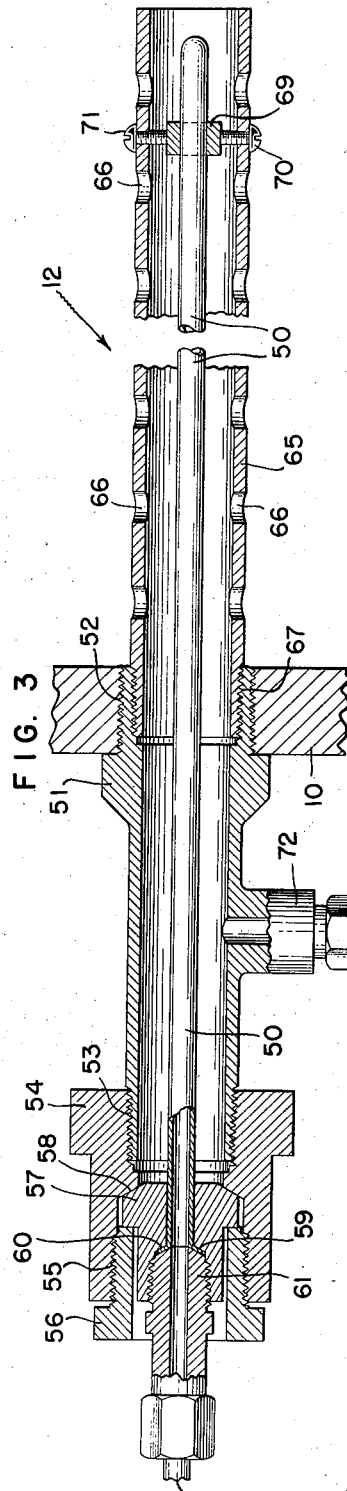
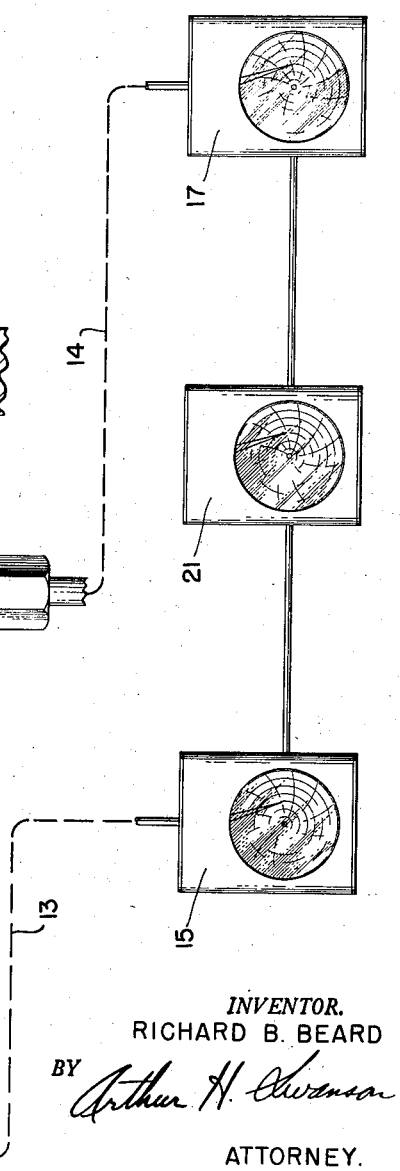
INVENTOR.
RICHARD B. BEARD
BY Arthur H. Swanson
ATTORNEY.

United States Patent Office 2,886,478
Patented May 12, 1959

2,886,478
METHOD AND CONTROL APPARATUS FOR CARBURIZING FERROUS OBJECTS

Richard B. Beard, Philadelphia, Pa., assignor to Minneapolis-Honeywell Regulator Company, Minneapolis, Minn., a corporation of Delaware Application June 29, 1953, Serial No. 364,711

14 Claims. (Cl. 148—16.5)

A general object of the present invention is to provide a new and improved method of and means for determining and controlling the composition of the atmosphere of a heat treating furnace. More particularly, the present invention is concerned with apparatus for directly measuring the percentage of hydrogen in a heat treating furnace atmosphere as well as a constituent potential of the heat treating atmosphere.

Heat treating furnaces are employed to establish certain metallic structure in or on metals to enhance certain factors in the metals which will provide long wear, surface toughness, etc. Iron and its related alloys, for example, are thermally heat treated by adding carbon to the metal, generally only to the metal on or near the surface. Iron has the ability to sorb and react with carbon, particularly when heated and when exposed to an atmosphere which contains carbon in some form such as carbon monoxide or methane ($CH_4$). As long as the "carbon potential" of the atmosphere is greater than the "carbon potential" of the iron, the carbon will be sorbed by and reacted with the iron for a depth and to an extent dependent upon the time during which the metal is exposed to the atmosphere. If the "carbon potential" of the atmosphere becomes less than that of the iron, the iron will give up carbon to the atmosphere.

Early methods of heat treating involved packing carbon blocks around the materials which were to be treated and heating the combination for a period to allow the carbon to soak into the iron. Later methods involved using an enriched gaseous atmosphere containing either or both carbon monoxide (CO) and methane ($CH_4$). In this arrangement the material being treated is placed to be exposed to the atmosphere and allowed to soak for a period of time. Great care is taken in this later method to maintain the "richness" atmosphere below a point at which any carbon would be allowed to deposit on top of the metal surface. Such a depositing, referred to as sooting, will generally impede the carburizing action as well as produce uneven treating.

It is known that the ability of iron to sorb and react with carbon is greatest when the basic metal is first exposed to a heat treating atmosphere. When the surface has sorbed and reacted with a certain amount of carbon and the carbon has diffused into the metal, the diffusion rate of the carbon will decrease. With the decreased diffusion rate into the metal, the danger of sooting increases and the heat treating action must be limited as the sooting, in addition to cutting down the carburizing action, will cause pitting and other surface roughnesses which cannot be tolerated in many instances. In other words, the metal first sorbs carbon on the surface and this carbon then diffuses into and reacts with the metal to a depth dependent upon factors including time and temperature. As the carbon builds up in the metal, the rate of diffusion into the metal will decrease and this will result in the sorption on the surface decreasing. If the differential between the carbon in the atmosphere and that on the surface becomes great enough so that the carbon cannot be diffused into the metal at a sufficient rate, carbon will build up on the surface and a sooting condition will exist.

The present invention is arranged to take advantage of the ability of iron to diffuse a greater amount of carbon when the heat treating action is started. This is accomplished by observing not only the percent of surface carbon but also the rate of change of the surface carbon. As the carburizing action of the heat treating atmosphere is important in determining the net result, it is further desirable to know something about this atmosphere. As the atmosphere generally contains methane ($CH_4$), hydrogen ($H_2$), water ($H_2O$), carbon dioxide ($CO_2$), and carbon monoxide (CO), the heat treating atmosphere will be related to these factors. These factors are also related to the $Fe_3C$ to Fe ratio by the following principal equations:

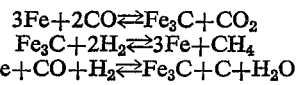

By considering the phases of the metal and the constituents of the atmosphere and the way they react to one another according to the phase rules and equilibrium rules, a system can be set up to control the carburization of a metal. This system comprises the measurement and control of the rate of deposition of carbon into a metal. As the deposition rate is determined by the constituents of the gas, of which hydrogen forms a major constituent, the present control apparatus incorporates hydrogen as a variable which may be controlled to balance or unbalance the atmosphere to carburize, decarburize, or hold the metal in a neutral position.

By controlling furnace pressure, temperature, and sensing the percent hydrogen as well as the percent surface carbon on the surface of the metal, it is possible to greatly improve the control of a heat treating operation.

The percent surface carbon may be determined by placing a suitable sensing element directly into the furnace to determine the carburizing action of the atmosphere. This apparatus must also be carefully arranged so as to eliminate ambient temperature conditions and other ambient conditions which will affect the measuring of the carburizing action of the atmosphere. By suitable rate taking circuitry, it is possible to observe the rate of change of the percent surface carbon and make this rate indication available for controlling purposes.

The input enriching gas to the furnace should contain a certain amount of hydrogen which must be known for accurate control. The sensing of the hydrogen in the enriching gas is best accomplished at the point of entry into the furnace although it may be accomplished elsewhere.

It is also desirable to know the amount of hydrogen present in the furnace proper to aid the operator in improving the operation of the treating process.

The most satisfactory method of determining the percentage hydrogen present in the furnace is to place directly in the furnace a measuring element suitable to determine the partial pressure due to the hydrogen. To be useable, this partial pressure should be properly referenced to the total furnace pressure, and may be in terms of a percentage. The problem of measuring the hydrogen in the furnace atmosphere directly in the furnace has been difficult because of the necessity of eliminating the effects of other gases in the atmosphere of the furnace or the atmosphere external to the furnace wherein indicating elements may be connected to the basic sensing elements.

It is therefore a more specific object of the present invention to provide an improved apparatus for controlling an atmosphere of a heat treating furnace wherein a measured and another component of the atmosphere directly related to the heat treating action is also measured.

A still further more specific object of the present invention is to provide an atmosphere controlling apparatus which senses the rate of change of a constituent potential of the atmosphere as well as the amplitude of a further constituent of the atmosphere.

A further more specific object of the present invention is to provide an improved atmospheric analyzing apparatus wherein a partial pressure of one of the constituents of the atmosphere is measured and compared with the total pressure of the atmosphere so that the amount of a constituent may be determined.

Still another more specific object of the present invention is to provide means for determining the partial pressure of a gas in an atmosphere, which is heated, by means of a gaseous permeable element which projects into the atmosphere and is exposed to the temperature of the atmosphere with the other end of the element projecting to a point outside of the space containing the atmosphere wherein the ambient temperature will eliminate the tendencies of gas to permeate through the element as well as the couplings thereto.

Another object of the present invention is to provide means for regulating a heat treating atmosphere in accordance with the partial pressure of the hydrogen present in the atmosphere.

Still another more specific object of the present invention is to control the heat treating action of an atmosphere in accordance with the rate of change of the carbon potential of the atmosphere.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 3 shows one form that the hydrogen sensing element for the atmosphere may assume;

Figure 3A shows a modified form of hydrogen sensing element; and

Fig. 4 shows another modified form of sensing apparatus incorporating the basic principles present in Fig. 3.

Figure 1:
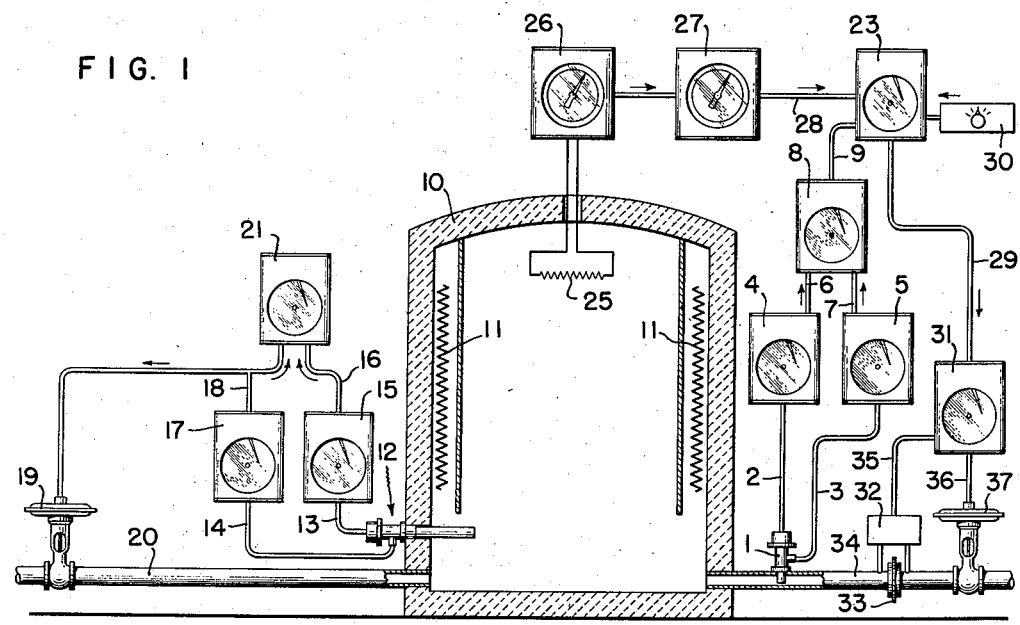
Fig. 1 represents a diagrammatic showing of a heat treating furnace and a controller therefor used in accordance with the present invention.

Referring first to Fig. 1, the numeral 10 represents a heat treating furnace which may be used to apply an appropriate "case" to metals which are placed therein. Part of the heating for the furnace 10 is obtained from electrical heaters 11 which are effective to maintain a substantially fixed temperature within the furnace 10 by means not shown.

In a heat treating atmosphere used in carburizing the metal treated, hydrogen is one of the principal constituents of the atmosphere for determining the manner in which this carburizing of the treated metal will take place. As mentioned above, if the hydrogen content of the incoming enriching atmosphere is maintained constant, it is not necessary to provide additional corrective means in a control apparatus for regulating the heat treating atmosphere. However, due to the fact that the gas companies are continuously changing the gases present in the commercial lines, it is essential that some means be provided to indicate this hydrogen content change. The sensing of the hydrogen in the input enriching gas line is accomplished by a partial pressure sensing element 1 which may be of the general type shown in Fig. 3, to be discussed below. The element has a hydrogen partial pressure output connection 2 and a total pressure connection 3. The connection 2 leads to a partial pressure recorder 4 and the connection 3 leads to a total pressure recorder 5, each recorder being effective to make an appropriate record and produce an output pressure proportional to the input pressure. The output pressure from recorder 4 is applied by way of a conduit 6 to the input of a ratio recorder 8 and the output from recorder 5 is applied by way of conduit 7 to the recorder 8. The ratio recorder 8 will reference the partial hydrogen pressure to total pressure and produce an output pressure in conduit 9 which is proportional to the percent of hydrogen in the incoming enriching gas.

Knowledge of the hydrogen partial pressure in the furnace 10 is also useful to the operator both during startup and during operation. For this purpose, the sensing element 12 is provided. This sensing element may also be of the type in Fig. 3 as will be discussed in detail below. For the moment, it is but necessary to realize that the element 12 will produce an output pressure in conduit 13 which is the partial pressure of the hydrogen present in the atmosphere in the furnace 10. A further output conduit 14 is arranged to have the total atmospheric pressure applied thereto. The partial pressure of the hydrogen in the conduit 13 is applied to the instrument 15 which will indicate and record the partial pressure of the hydrogen in the furnace. In addition, the instrument 15 is arranged to produce an output pressure in conduit 16 which is proportional to the partial pressure of the hydrogen on the input. The total atmospheric pressure appearing in conduit 14 is applied to a further instrument 17 which instrument is also effective to produce a proportional output control pressure in conduit 18. The instruments 4, 5, 15 and 17 may well take the form of the apparatus shown in the patent to E. C. Burdick, No. 2,548,943. The output pressure in the conduit 18 may be used to regulate a valve 19 which in turn will establish the primary pressure within the furnace 10 by way of the inlet conduit 20 which conducts the basic atmosphere to the furnace.

The output pressures in the conduits 16 and 18, that is the partial and total pressures, are fed to a suitable ratioing instrument 21. This instrument is effective to indicate the ratio of the partial hydrogen pressure to total atmospheric pressure and record the same. The ratioing instruments 8 and 21 may well be of the type shown in the patent of E. C. Burdick, No. 2,410,335.

Also positioned in the furnace 10 is a carbon potential sensing element 25. This element generally takes the form of a fine iron wire which, when placed in the atmosphere, will tend to sorb and react with carbon from the atmosphere in accordance with the carbon potential of the atmosphere. The resistance of the element 25 will change in accordance with the amount of carbon sorbed and reacted therein and this will give an indication of the percent surface carbon and will represent the surface condition of any metal which is being treated. This resistance or carbon potential sensing element 25 is arranged for connection to a suitable indicating and recording instrument 26 which receives the electrical signal from the element 25 and indicate and record the electrical resistance of the element which will be proportional to the carbon potential of the atmosphere. The instrument 26 may also be arranged to produce an output control signal in accordance with the rate of operation thereof. A preferred form for the instrument 26 is the instrument disclosed in the patent to Walter P. Wills, No. 2,423,540, issued July 8, 1947.

In the event that a rate of change of the carbon potential is a measurement which is desired, a further instrument of the same type as 26 may be incorporated. The signal input to the instrument 27 may well be taken from a suitable rate taking device in the apparatus 26, such as a velocity generator which is responsive to the balancing motor operation. Such a velocity generator is shown in Williams Patent 2,113,164 and is driven by a balancing motor such as that shown in the aforementioned Wills patent. Obviously, other rate taking arrangements may be incorporated. The instrument 27 will be effective to produce an output control pressure in conduit 28 and this is applied to the input of an instrument 23 along with an input signal from conduit 9. The instrument will in turn produce an output pressure in conduit 29 which will be proportional to the rate of change of the carbon potential of the atmosphere as referenced with respect to the amount of hydrogen present in the enriching gas as indicated by the input pressure in conduit 9. Manual means such as at 30 may be used to establish the desired set point of the system. The pressure in conduit 29 is applied to a further ratioing instrument 31 which may also be of the form of the instruments 8, 21 and 23.

The instrument 31 also has as an input signal a pressure derived from an appropriate differential pressure sensing element 32 which is connected across a suitable orifice plate 33 which is in an enriching gas flow line 34. The output pressure from the differential pressure sensing device 32 will appear in conduit 35 and be applied to the input of the instrument 31 along with the pressure from the conduit 29. The pressure in conduit 29 will be effective to establish a set point for the flow of the gases through the conduit 34 and produce an output controlling pressure in the conduit 36 which in turn will regulate a flow control valve 37.

In considering the operation of the apparatus of Fig. 1, it is first to be noted that a certain carburizing action is desired from the atmosphere present in the furnace. This carburizing action will be determined directly by the variations in resistance of the element 25. The electrical resistance change of the element 25 will produce appropriate indications upon the instrument 26 with the rate of change signal appearing on the output of the instrument 26 and applied to the instrument 27. This rate of change signal is converted into a proportional pressure in the conduit 28 by the instrument 27 and is applied to the instrument 23.

It is assumed that the hydrogen pressure in the furnace is constant so that the pressure in conduit 9 on the input of instrument 23 is also constant. With the fixed control point, as set by the adjuster 30, the only input signal will be the rate of change of the carbon potential of the atmosphere and this will produce an appropriate output pressure in the conduit 29. As mentioned previously the metal being heat treated is capable of sorbing and reacting with much more carbon at the start of the carburizing operation than after a certain amount of carbon has been sorbed and reacted therein. Therefore, the pressure in conduit 29 going into the instrument 31 may be used to set the instrument 31 so as to regulate the flow in the pipe 34 with the regulation being, with respect to time, such as to decrease the carburizing action of the atmosphere. The need for the flow measuring apparatus 32 is because the pressures in the enriching gas conduit 34 may vary and it is desired that these variations be compensated.

In the event that the hydrogen content of the enriching atmosphere changes, the sensing element 1 will detect this change and produce an output partial pressure signal from the instrument 4 in conduit 6 which is applied to the instrument 8. The total pressure of the enriching atmosphere will be indicated by the instrument 5 and appear as an output control signal in conduit 7.

The output of the ratioing instrument 8 will give the amount of the hydrogen or percent of the hydrogen present in the enriching atmosphere and this output is used to reset the basic control point of the instrument 23. In general, but not necessarily always, with a greater amount of hydrogen present, the carburizing action of the atmosphere will increase and it is necessary that appropriate adjustments be made in the enriching gas in order to correct for this change. Conversely, if the amount of hydrogen should decrease, it is essential that the flow of enriching gas be changed so as to increase the carburizing action of the atmosphere.

While the apparatus shown in Fig. 1 has been arranged for using the rate of change of the carbon potential in the furnace, it will be obvious that the output of the instrument 26 may be applied directly to the instrument 23 without going through any rate taking apparatus. The selection of one ararngement over the other is dependent upon the operator and the work metal which is being heat treated. If the rate taking apparatus is eliminated, the enriching gas flow will be controlled in accordance with the actual carbon potential instead of the rate of change of the carbon potential. In all other respects, the operation of the apparatus will be substantially the same. While reference has been made to controlling the enriching gas flowing to the furnace, it will be understood that the enriching gas may be generated directly within the furnace by cracking oil, and the like. Under such circumstances, the enriching gas may be controlled by regulating the flow of the oil into the furnace and the hydrogen sensing means for the regulator may be positioned adjacent the area where the oil is cracked.

The sensing element 12 provides the operator with an indication of the hydrogen conditions within the furnace, by way of the instruments 17, 15 and 21. Thus, on startup, the atmosphere within the furnace 10 must be of a certain character prior to the insertion of a work piece in the furnace. The particular character of the atmosphere will be dependent upon the type of furnace as well as the particular heat treating operation that is to be accomplished. The output of the instrument 17 may also be used to establish constant pressure in the furnace by regulating the incoming basic atmosphere. This control is accomplished in furnaces where the pressure is not maintained constant by other means.

Figure 2:
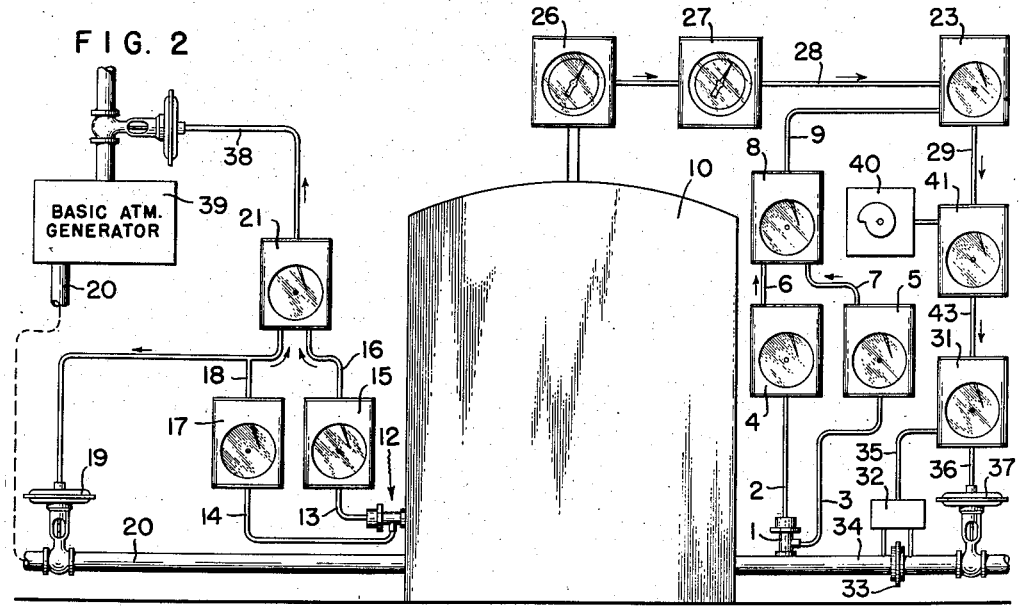
Fig. 2 shows a modified form of the apparatus arranged for automatic control.

Referring to Fig. 2, the apparatus has been arranged for automatic control. The additions to the apparatus of Fig. 2 over that of Fig. 1 include a program controller 40 which is effective to apply a suitable controlling pressure to an instrument 41. This instrument may also take the form of the instruments 21, 23, and 31. In addition, the instrument 21 is shown with an output pressure connection 38 which is connected to regulate the operation of a basic atmosphere generator 39. All of the other components of the apparatus shown in Fig. 2 correspond to those of Fig. 1 and carry corresponding reference numerals.

During startup of the apparatus of Fig. 2, it may be desired to bring the atmosphere in the furnace 10 to a desired point. For this purpose, the instrument 21 may produce an output pressure in conduit 38 proportional to the percent hydrogen in the furnace 10 and regulate the output of the basic atmosphere generator 39. This control will be cut out as soon as the atmosphere is at the desired point by means of a timer, or other means, not shown. If desired, the sensing element 12 may be placed directly in the feed line 20 to continuously control the basic atmosphere generator 39.

After the work piece has been placed in the furnace and it is desired to effect the heat treating operation, the output pressure from the instrument 23, as it appears in conduit 29, in Fig. 2, is applied to the input of the instrument 41 as well as the output pressure from the instrument 40. The output pressure from the instrument 41 appears in conduit 43 and is applied to the instrument 31.

The basic operation of the apparatus of Fig. 2, after startup, is the same as that of Fig. 1 with the exception that instead of manually determining the control point, the control point is determined in accordance with the type of heat treating operation desired. Thus, the program controller 40 will provide an output control pressure which will vary in accordance with a predetermined schedule. A representative schedule may call for rapid carburization of the work metal during the start of the heat treating operation with a gradual decrease of the carburization action. Toward the end of the heat treating process it may be desired to reverse the carburization process so that the carbon will leave the surface of the treated metal and this may also be accomplished by the controller.

The overall effect of the instrument 40 is to cause the instrument 41 to vary its output pressure in conduit 43 with the resultant changes in the flow of gas in conduit 34. The changing of the flow of the gas in the conduit 34 will produce an appropriate carbon potential change as indicated by the instrument 26 and this in turn will create a signal which will close the loop back to the instrument 41. Thus, the apparatus will tend to produce a controlling action or carburizing action which will be dependent upon the operation of the cam controller 40.

As in the case of Fig. 1, the rate of change of the carbon potential may be eliminated by taking a pneumatic pressure directly from the output of the instrument 26 and applying it directly to the instrument 23. Further, as in Fig. 1, changes of hydrogen present in the enriching gas inlet to the furnace 10 will be effective to reset the instrument 23 and therefore the rate of flow of the enriching gas in the conduit 34.

Referring now to Fig. 3, there is shown a preferred form of the hydrogen partial pressure sensing element as it may appear in the sensing elements 1 and 12. The heart of the sensing element is an elongated hollow tube 50. This tube is preferably made of palladium; however, platinum may also be used. Palladium or platinum are selected because of the high selective permeability of palladium and platinum to hydrogen. Thus, the tube 50 acts, especially when heated, as an open window to hydrogen and it excludes all other gases present in the atmosphere wherein the element is positioned. As the hydrogen will readily permeate through the element 50, the pressure within the element 50 will be the partial pressure of the hydrogen present in the atmosphere. The tube 50 is supported in the wall of the furnace, or the wall of the space wherein the atmosphere is to be determined, by means of a hollow cylindrical member 51 which is threaded at 52 to engage appropriate threading in the wall through which the element is to project. The element 51 is also threaded at 53 to threadedly engage a bushing 54. The bushing 54 is threaded on the inner surface at 55 so as to threadedly receive a tightening member 56. The member 56 is arranged to bear against a further bushing 57 which engages a sloped surface of the bushing 54 at 58. The member 56 is screwed down tightly so as to make an airtight seal at the surface 58 between the bushings 57 and 54.

The palladium tube 50 is flared at its outer end at 59 and rests against the inner surface of shoulder 60 of the bushing 57. A further coupling element 61 is screwed into the bushing 57 so as to establish a pressure connection by way of conduit 13 to the instrument 15.

Protecting the portion of the tube 50 which extends into the atmosphere is a protective sleeve 65 which has a plurality of holes 66 extending therethrough with the holes providing adequate circulation of the atmosphere around the element. The sleeve 65 is threadedly mounted at 67 to the mounting member 51.

Depending upon how the sensing element is mounted in the furnace or in the incoming gas lines, it may be necessary to provide some means for preventing the element 50 from drooping. This is provided in the present arrangement by a washer 69 which surrounds an outer end portion of the tube 50 and which is centered by centering screws 70 and 71 and, two other screws which are at right angles to the screws 70 and 71, not shown.

In the event it is desired to eliminate the centering screws referring to Figure 3A, a strengthened tube may be provided by plating a palladium layer 75 on a steel or iron tube 76. The palladium will act as the element permeable to the hydrogen and this hydrogen will in turn permeate through the steel or iron. While the permeation rate through the iron or steel is not great, increased surface area will provide sufficient permeation to allow a hydrogen partial pressure measurement on the inside of the tube. Further, the palladium coating will prevent the atmosphere from reacting with the iron or steel.

Extending from the mounting member 51 at right angles thereto is a total pressure takeoff connection 72. The total pressure of the atmosphere wherein the element 50 is mounted will appear in the connection 72 and thus in the conduit 14 which is connected to the instrument 17.

It will be noted in Fig. 3 that the element 50 is relatively long and is arranged to project a considerable distance into the atmosphere under examination. It will be further noted that the outer end is considerably removed from the atmosphere. The need for this arrangement will be readily apparent when it is considered that most metals will permeate gases therethrough when they are heated. Thus, if a coupling were made to the element 50 at a point within the atmosphere wherein the coupling would be heated to the atmospheric temperature, the apparatus would no longer be effective to indicate only the partial pressure of the hydrogen. The pressure within the system would then be some other pressure which would include the pressures of other gases which would permeate through the coupling. As such an arrangement would obviously be totally unsatisfactory for a control wherein hydrogen content alone is desired, it is important that this tube be extended outside of the space to a point where the coupling thereto will be cool.

It will be noted that the output connections by conduits 13 and 14 go to the partial pressure measuring instrument 15 and the total pressure measuring instrument 17 respectively. These instruments in turn go to the ratioing apparatus 21 which is used to indicate the ratio of the hydrogen to total pressure. It will be obvious that the instrument shown in Fig. 3 may be used independently of the overall atmosphere control system and may be used wherever it is desired to determine the amount of hydrogen present in an atmosphere.

The apparatus of Fig. 4 shows another form of apparatus which may be used to determine the characteristics or constituents of a gaseous atmosphere. This apparatus comprises a hollow cylindrical member 80 which is arranged to threadedly receive a bushing 81 which retains a gaseous permeable element 82 in the end thereof. This element may well take the form of an iron gauze or a metal hydride gauze. An elbow 83 on the other end of the cylindrical member 80 provides an outlet for the chamber defined by the cylinder 80. Projecting through the elbow 83 is a second gaseous permeable element 84 which is arranged to threadedly engage the elbow by a shoulder thereof. The element 84 is preferably made of either palladium or platinum which has high selective permeability to hydrogen. In low temperature applications, this element may also be formed of zirconium, as zirconium exhibits high permeability to hydrogen at low temperatures.

An output pressure connection 85 connects to a conduit 86 and is used to apply the internal partial pressure of the element 84 to a partial pressure measuring instrument 87. This instrument may also take the form of the indicating instrument 15.

The apparatus of Fig. 4 may be so positioned that the gases will be drawn through the chamber 80 through the gauze 82 and thence out through the elbow 83. If moisture in the atmosphere is to be determined, the iron gauze may be used since the moisture will react with the iron and form ferric oxide and will release hydrogen into the chamber defined by the cylinder 80. The hydrogen present will be detected by the partial pressure sensing element 84 which will feed the partial pressure to the indicating instrument 87. In certain atmospheres, the reading of the instrument 87 may be calibrated directly in terms of moisture content of the atmosphere. In place of the iron gauze, the diffusion element 82 may take the form of a metallic hydride which will have the effect of releasing hydrogen in accordance with the chemical change taking place within the gauze which will be dependent upon some constituent displacing the hydrogen from the metal hydride. Again, the partial pressure sensing element 84 may be used to determine the partial pressure of the gas within the chamber 80 and thus the particular constituent of the atmosphere which is under examination. It will be obvious that the partial pressure signal, as in Fig. 2, may be referenced to total pressure. This figure further demonstrates the wide use which may be put to the basic gaseous permeable element in analyzing gaseous atmospheres.

While, in accordance with the provisions of the statutes, there has been illustrated and described preferred embodiments of the invention, those skilled in the art will understand that changes may be made in the form of the apparatus disclosed without departing from the spirit of the invention as set forth in the appended claims, and that some features of the present invention may be used to advantage without a corresponding use of other features.

Having now described my invention, what I claim as new and desire to secure by Letters Patent is:

1. Apparatus for controlling the atmosphere of a heat treating furnace comprising, hydrogen sensing means for determining the percent hydrogen present in an atmosphere used in the furnace, constituent potential measuring means, and an atmosphere controlling means connected to be controlled by said hydrogen sensing means and said constituent potential measuring means.

2. Regulating apparatus for the atmosphere of a heat treating furnace comprising hydrogen sensing means arranged to determine the partial pressure of a furnace atmosphere, total pressure sensing means for determining a total furnace atmosphere pressure, ratio control means connected to both of said sensing means and having an output proportional to the percent hydrogen in the atmosphere, constituent potential measuring means for the atmosphere, in the furnace, and atmosphere control means arranged to be controlled by said ratio control means and said constituent potential measuring means.

3. Regulating apparatus for a heat treating furnace atmosphere comprising, constituent potential measuring apparatus, means determining the rate of change of said constituent potential connected to said measuring apparatus, and an atmosphere controller connected to be regulated by said last named means.

4. A heat treating furnace atmosphere controller comprising, a gaseous permeable means for determining the hydrogen content of an input atmosphere to the furnace, means for determining a constituent potential of the atmosphere, and controlling means for the atmosphere connected to be regulated by both of said means.

5. A heat treating furnace atmosphere controller comprising, means for determining the hydrogen content of an input furnace gas, means for measuring the rate of change of a constituent potential of the atmosphere, and controlling means for the atmosphere connected to be regulated by both of said means.

6. In apparatus for regulating a heat treating furnace atmosphere, comprising, a gaseous permeable sensing element arranged for projection into the furnace to determine the partial pressure of a gas within the furnace, an atmosphere constituent potential rate of change measuring apparatus, and controlling means for the atmosphere arranged to be regulated by said sensing element and said measuring apparatus.

7. Apparatus for regulating the atmosphere of a heat treating furnace having a basic atmosphere supplied thereto comprising, hydrogen partial pressure sensing means for determining the partial pressure of hydrogen directly within the furnace, total furnace pressure sensing means, and means for controlling the pressure of said basic atmosphere arranged to be adjusted by said total pressure sensing means, and means for controlling hydrogen of said basic atmosphere arranged to be adjusted by said partial pressure and total pressure sensing means.

8. Apparatus for regulating the atmosphere of a heat treating furnace having a basic atmosphere supplied thereto comprising, hydrogen partial pressure sensing means for determining the partial pressure of hydrogen directly within the furnace, total furnace pressure sensing means, and means for controlling the hydrogen content of said basic atmosphere arranged to be adjusted by said partial pressure and total pressure sensing means.

9. Apparatus for regulating the atmosphere of a heat treating furnace having a basic atmosphere and an enriching gas supplied thereto comprising, hydrogen partial pressure sensing means for determining the partial pressure of hydrogen directly in the enriching gas supplied to the furnace, total pressure sensing means, means for controlling said basic atmosphere arranged to be adjusted by said total pressure sensing means, enriching gas flow sensing means, furnace atmosphere constituent potential sensing means, and means connecting said partial pressure sensing means, said flow sensing means and said constituent potential sensing means to control the flow of said enriching gas.

10. The method of regulating a carburizing atmosphere used in a heat treating chamber which comprises, regulating the flow of a carburizing gas to the carburizing atmosphere by means responsive to the rate of change of the carbon potential of the atmosphere, and modifying the flow of the gas by means responsive to the hydrogen content change of a gas supplied to the carburizing atmosphere.

11. Apparatus for regulating the carburizing action of a heat treating atmosphere comprising, carbon potential sensing means arranged to be positioned in the atmosphere, a program controller for variably selecting a desired carbon potential of the atmosphere, and an atmosphere controller variably adjusted by said sensing means and said program controller.

12. Apparatus for regulating the carburizing action of a heat treating atmosphere comprising, carbon potential sensing means arranged to be positioned in the atmosphere, hydrogen partial pressure sensing means arranged to be positioned within a gas supplied to said atmosphere, a program controller for variably selecting a desired carbon potential of the atmosphere, and an atmosphere controller connected to be adjusted by said carbon potential sensing means, said hydrogen partial pressure sensing means, and said program controller.

13. In the art of heat treating a material with a heat treating constituent, the method of regulating the heat treating operation within a treating chamber which comprises regulating the flow of a gas bearing a heat treating constituent to the chamber by means responsive to the rate of change of the concentration of the constituent in the chamber.

14. In the art of heat treating a material with carbon, the method of regulating the carburization operation within a treating chamber which comprises regulating the flow of an atmosphere bearing carbon to the chamber by means responsive to the rate of change of the concentration of the carbon in the chamber.

References Cited in the file of this patent

UNITED STATES PATENTS

| | | |
|---|---|---|
| 1,709,042 | Siebert | Apr. 16, 1929 |
| 2,079,601 | Canfield | May 11, 1937 |
| 2,298,288 | Gerrish et al. | Oct. 13, 1942 |
| 2,456,163 | Watson | Dec. 14, 1948 |
| 2,459,618 | Cartier | Jan. 18, 1949 |
| 2,465,864 | Freeman et al. | Mar. 29, 1949 |
| 2,541,857 | Besselman et al. | Feb. 13, 1951 |
| 2,671,336 | Hulsberg | Mar. 9, 1954 |
| 2,698,222 | Davis | Dec. 28, 1954 |
| 2,752,147 | Besselman et al. | June 26, 1956 |